(12) United States Patent
Nowak

(10) Patent No.: US 8,087,678 B2
(45) Date of Patent: Jan. 3, 2012

(54) COMBINATION CART AND STAND DEVICE

(76) Inventor: Mark Adam Nowak, Elk Grove, CA (US)

( * ) Notice: Subject to any disclaimer, the term of this patent is extended or adjusted under 35 U.S.C. 154(b) by 261 days.

(21) Appl. No.: 12/070,116

(22) Filed: Feb. 14, 2008

(65) Prior Publication Data

US 2008/0197587 A1    Aug. 21, 2008

Related U.S. Application Data

(60) Provisional application No. 60/901,840, filed on Feb. 15, 2007.

(51) Int. Cl.
*B62B 1/20*    (2006.01)
(52) U.S. Cl. .................... 280/35; 280/652; 280/47.29
(58) Field of Classification Search .................. 280/638, 280/35, 639, 652, 43.1, 47.24, 47.26, 47.27, 280/47.28, 47.29, 79.11, 79.5
See application file for complete search history.

(56) References Cited

U.S. PATENT DOCUMENTS

| | | | |
|---|---|---|---|
| 840,130 A | 1/1907 | Hylton | |
| 861,093 A | 7/1907 | Cordley | |
| 1,392,486 A | 10/1921 | Dice | |
| 1,929,136 A | 10/1933 | Bertels | |
| 5,846,043 A * | 12/1998 | Spath | 414/343 |
| 5,938,396 A * | 8/1999 | Audet | 414/490 |
| 6,047,866 A * | 4/2000 | Brown | 222/608 |
| 6,220,610 B1 * | 4/2001 | Cox | 280/47.19 |
| 6,247,710 B1 * | 6/2001 | Luberda | 280/47.28 |
| 6,364,328 B1 * | 4/2002 | Stahler, Sr. | 280/47.18 |
| 6,517,036 B1 | 2/2003 | Ramirez, Jr. | |
| 6,830,253 B1 * | 12/2004 | Porras et al. | 280/47.26 |
| 6,971,654 B2 * | 12/2005 | Amsili | 280/47.2 |

* cited by examiner

*Primary Examiner* — John Walters
(74) *Attorney, Agent, or Firm* — Audrey A. Millemann; Weintraub Genshlea et al.

(57) ABSTRACT

Combination cart and stand device comprised of a main frame assembly, a wheel assembly operatively coupled proximate to one end of the main frame assembly, and inner and outer support members pivotally coupled to the main frame assembly at a location distal from said wheel assembly wherein the main frame assembly, the inner support member, and the outer support member nest together to form a folded cart configuration while the main frame supports a liquid dispensing container which is transported by wheels of the wheel assembly rolling along an underlying surface of the device and wherein the inner and outer support members pivot apart and the main frame assembly pivots to an inverted elevated position for forming a stand configuration for supporting the liquid dispensing container in an elevated liquid dispensing position. Other types of containers can also be employed with the combination cart and stand device.

9 Claims, 10 Drawing Sheets

COMBINATION CART AND STAND DEVICE

CROSS-REFERENCE TO RELATED APPLICATIONS

This application claims priority to U.S. Provisional Patent Application No. 60/901,840, filed Feb. 15, 2007, the entire disclosure of which is incorporated herein by reference.

FIELD OF THE INVENTION

This invention relates generally to a combination cart and stand device and, in particular, to a combination cart and stand device selectively convertible between a cart and a stand configuration for transporting and supporting a container such as a liquid dispensing container.

BACKGROUND OF THE INVENTION

Various free standing container stands such as water cooler stands are disclosed in the prior art one of which is a free standing water cooler stand that is attachable to a pickup truck bed or trailer hitch.

In U.S. Pat. No. 6,517,036, issued Feb. 11, 2003, Ramirez, Jr., discloses a water cooler holder made from either metal hollow bars, flat bars and/or wires for removable attachment to various regions of a pickup vehicle, a post, or which may be free standing. In one embodiment, the holder has a tripod shape, the three legs being joined by upper and lower tripod support bars pivotally attached to permit collapsing the tripod for transport and storage. In another embodiment, the holder has two parallel rings joined by support bars which hook over the side panel or tailgate of a pickup truck. Another embodiment has two parallel rings supported by an inverted cone attached to a tow bar for attachment to a trailer hitch. Yet another embodiment has two parallel rings with a clamp for attachment to a post.

In U.S. Pat. No. 861,093, issued Jul. 23, 1907, Cordley discloses a collapsible stand for supporting water coolers and accessories thereof. The stand can be folded up when boxed or crafted for shipment and can be unfolded and set up for use. When properly adjusted the various elements of the stand are locked in position thereby forming a strong and rigid stand especially adapted for the purpose specified.

In U.S. Pat. No. 840,130, issued Jan. 1, 1907, Hylton, discloses a free standing stand for water-coolers comprised of four supporting legs, a connecting-ring removably secured thereto, and a tank fitting in the ring and resting directly upon the upper ends of the four supporting legs wherein the stand may be assembled for use or taken apart for shipping purposes.

Other general free standing stands are also disclosed in the prior art. For example, in U.S. Pat. No. 1,929,136, issued Oct. 3, 1933, Bertels discloses a display stand for supporting containers at angles for display purposes and in U.S. Pat. No. 1,392,486, issued Oct. 4, 1921, Dice discloses a folding stand for firmly supporting objects such as paste pails, tubs, flower pots, work boards, such as plasterers' boards, etcetera.

Accordingly, the prior art fails to recognize and address the need to easily transport and dispense liquids proximate a source of a single person or an assembly of people undergoing various levels of activity wherein it is desirable and often necessary to refresh, rehydrate, and replenish them with liquids.

BRIEF SUMMARY OF THE INVENTION

Hence, and in one aspect, an embodiment of the invention provides a combination cart and stand device selectively convertible between a folded cart configuration for transporting a liquid dispensing container and a stationary unfolded stand configuration for supporting the liquid dispensing container in a liquid dispensing position. Thus, in one aspect, an embodiment of the instant invention is distinguished over the known prior art by recognizing and addressing the need to easily transport and dispense liquids such as water proximate a source of a single person or an assembly of people undergoing various levels of activity wherein it is desirable and often necessary to refresh, rehydrate, and replenish them with liquids. Additionally, and in one embodiment, the combination cart and stand device can be selectively converted into a free standing partially unfolded cart configuration for supporting the cart in a stationary position with or without the liquid dispensing container thereon.

In general, and in one aspect, an embodiment of the invention provides a combined cart and stand device convertible between a cart configuration and a stand configuration wherein the device comprises a generally U-shaped main frame; a pair of generally U-shaped support members pivotally coupled to the generally U-shaped main frame wherein the pair of generally U-shaped support members are shaped and sized to nest with one another and with the generally U-shaped main frame when the device is in the cart configuration; and means for converting the device between the cart and stand configurations.

More particularly, and in another aspect, an embodiment of the invention provides a combined cart and stand device comprising: a generally inverted U-shaped main frame comprised of a transverse member having outer ends transitioning into a pair of generally parallel elongated main frame members transversely spaced apart a distance for removably receiving a liquid dispensing container therebetween; a first platform and a second platform transversely extending between and operatively coupled to the pair of generally parallel elongated main frame members in a longitudinally spaced apart and facing relationship; means for rolling the generally inverted U-shaped main frame along an underlying surface of the device with the liquid dispensing container supported on the first platform; and means for supporting the generally inverted U-shaped main frame in a pivoted upright and elevated orientation with the liquid dispensing container supported on the second platform for positioning the liquid dispensing container in an elevated liquid dispensing orientation.

In another aspect, an embodiment of the invention provides a combined cart and stand device convertible between a cart and a stand configuration, the device comprising: a main frame comprised of a pair of generally parallel elongated main frame members transversely spaced apart a distance for removably receiving a liquid dispensing container therebetween; a first platform and a second platform transversely extending between and operatively coupled to the pair of generally parallel elongated main frame members in a longitudinally spaced apart and facing relationship; a wheel assembly supporting wheels and operatively coupled to the pair of generally parallel elongated main frame members for engaging an underlying surface of the device when the device is in the cart configuration for providing rolling movement of the device with the liquid dispensing container supported on the first platform; a pair of generally U-shaped support members having upper end portions; and means for pivotally coupling the upper end portions of the pair of generally U-shaped support members to the main frame at a location distal from the wheel assembly for pivoting the pair of generally U-shaped support members from a nested position relative to the main frame when the device is in the cart configuration to a spaced apart position and for pivotally inverting the main frame from a first position supporting the liquid dispensing container on the first platform to an elevated and inverted position when the device is in the stand configuration for supporting the liquid dispensing container on the second platform in an elevated liquid dispensing orientation.

In a further aspect, an embodiment of the invention provides a combined cart and stand device convertible between a cart configuration for transporting a liquid dispensing container and a stand configuration for supporting the liquid dispensing container in an elevated liquid dispensing orientation, the device comprising: a generally U-shaped main frame member having an inverted orientation in the cart configuration and comprised of a transverse handle member having outer ends transitioning to a pair of generally parallel elongated main frame members transversely spaced apart a distance for removably receiving the liquid dispensing container; a substantially horizontal cart platform and a substantially horizontal stand platform transversely extending between and operatively coupled to the pair of generally parallel elongated main frame members in a longitudinally spaced apart and facing relationship for supporting the liquid dispensing container on the cart platform between the pair of generally parallel elongated main frame members when the device is in the cart configuration and for supporting the liquid dispensing container on the stand platform between the pair of generally parallel elongated main frame members when the device is in the stand configuration; an axle connected to the pair of generally parallel elongated main frame members at a location distal from the transverse handle member; a pair of transversely spaced apart wheels mounted on the axle at a location inboard of the pair of generally parallel elongated main frame members for engaging an underlying surface of the device with the wheels when the device is in the cart configuration for allowing rolling movement of the device for transporting the liquid dispensing container supported on the cart platform; a pair of generally U-shaped support members; means for pivotally coupling the pair of generally U-shaped support members to the generally U-shaped main frame member at a location proximate the transverse handle member for pivoting the pair of generally U-shaped support members apart from a nested position in the cart configuration to a spaced apart position in the stand configuration and for pivotally inverting the generally U-shaped main frame member from the inverted orientation to an upright orientation; and means for locking the generally U-shaped main frame member in the upright orientation such that the generally U-shaped main frame member is supported by the spaced apart position of the generally U-shaped support members in the stand configuration for supporting the liquid dispensing container on the stand platform in an elevated liquid dispensing orientation.

Accordingly, it should be apparent that numerous modifications and adaptations may be resorted to without departing from the scope and fair meaning of the claims as set forth hereinbelow following the detailed description of the invention.

DETAILED DESCRIPTION OF THE INVENTION

Figure 1:
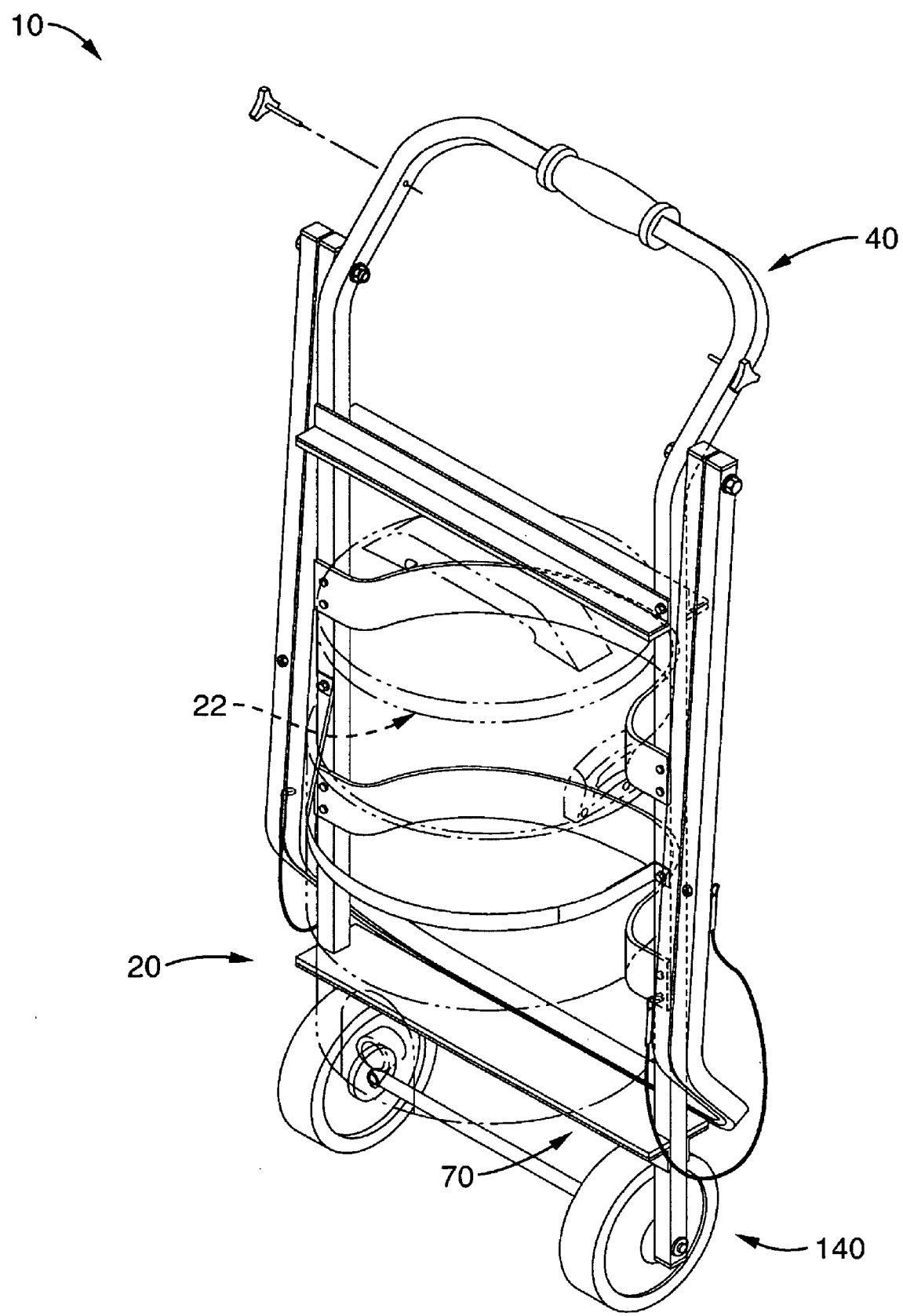
FIG. 1 is a perspective front view of an embodiment of a combination cart and stand device shown in a rolling cart configuration and shown supporting a liquid dispensing device illustrated in phantom.

Considering the drawings, wherein like reference numerals denote like parts throughout the various drawing figures, reference numeral 10 is directed to a combination cart and stand device selectively convertible between a cart and a stand configuration for transporting a liquid dispensing container such as a water container or other container and for supporting the liquid dispensing container or other container in an elevated position.

In general, and referring to FIG. 1, one embodiment of the combination cart and stand device 10 is comprised of a cart assembly 20 which is comprised of a main frame assembly 40 for receiving and supporting the liquid dispensing container 22 and supporting a wheel assembly 140 operatively coupled to the main frame assembly 40 for rolling movement of the device 10 and the liquid dispensing container 22 along an underlying surface thereby defining a rolling cart configuration.

Figure 2:
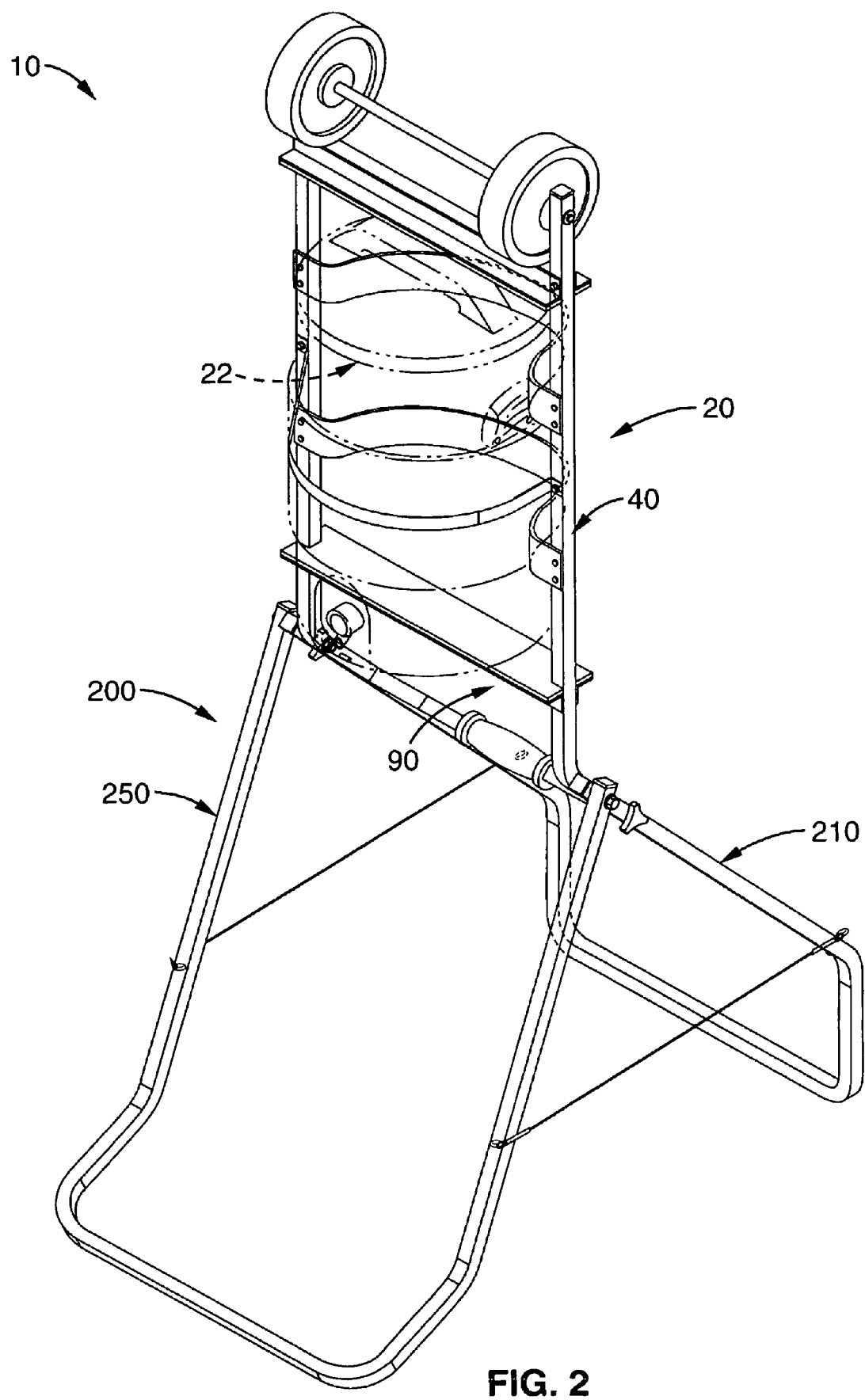
FIG. 2 is a perspective front view of an embodiment of the combination cart and stand device shown in a stationary stand configuration and shown supporting the phantom illustrated liquid dispensing device.

Additionally, and referring to FIG. 2, one embodiment of the combination cart and stand device 10 is further comprised of a support assembly 200 which is comprised of an inner support member 210 and an outer support member 250 which are positioned for supporting the cart assembly 20 in an inverted and elevated position relative to the underlying surface such that the liquid dispensing container 22 is received and supported by the main frame assembly 40 of the cart assembly 20 which, in turn, is supported on the underlying surface by the inner and outer support members 210 and 250 for defining a unfolded stand configuration for supporting the container 22 in an elevated liquid dispensing position.

Figure 3:
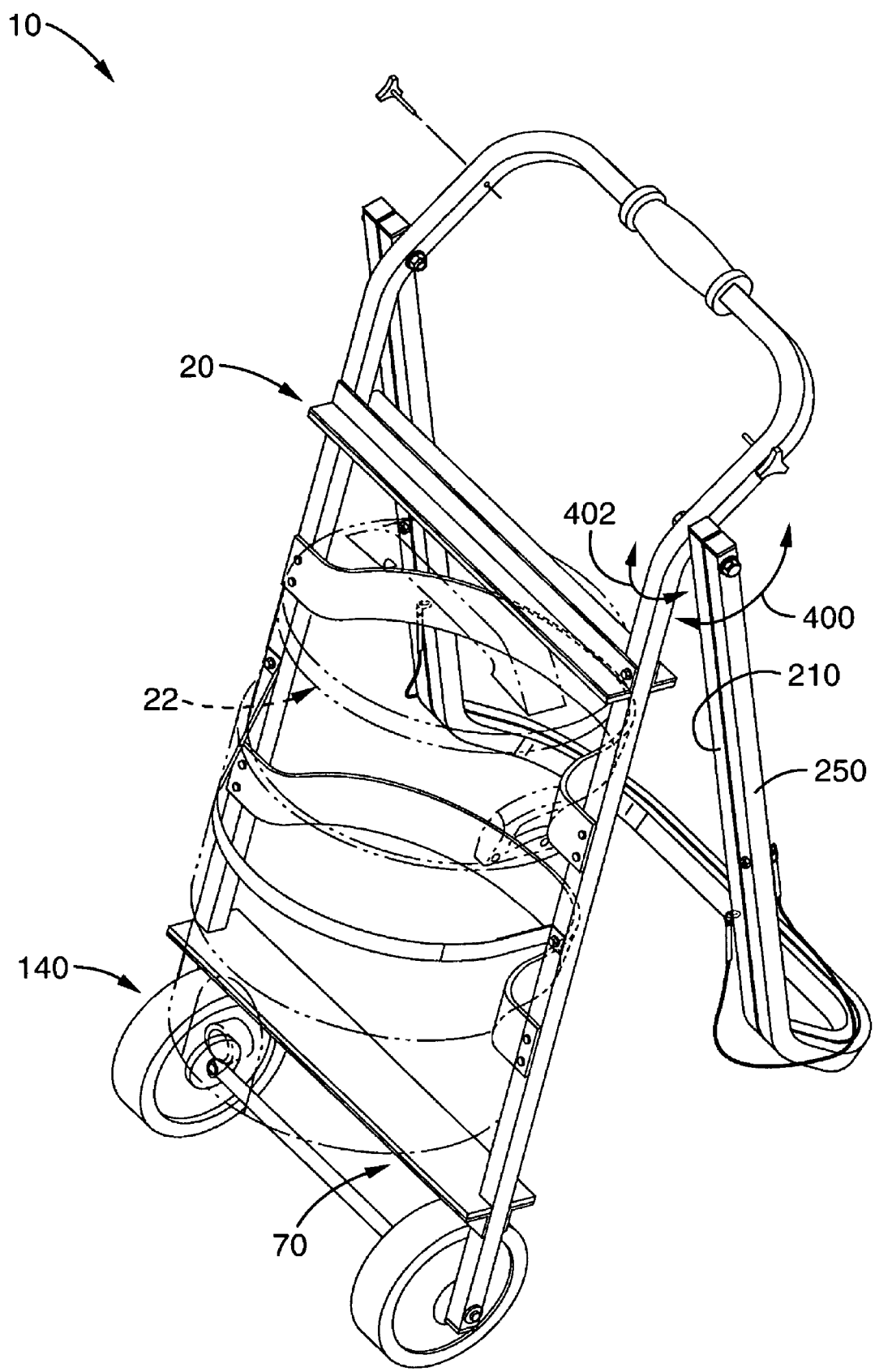
FIG. 3 is a perspective front view of an embodiment of the combination cart and stand device shown in a free standing cart configuration and shown supporting the phantom illustrated liquid dispensing device.
Figure 4:
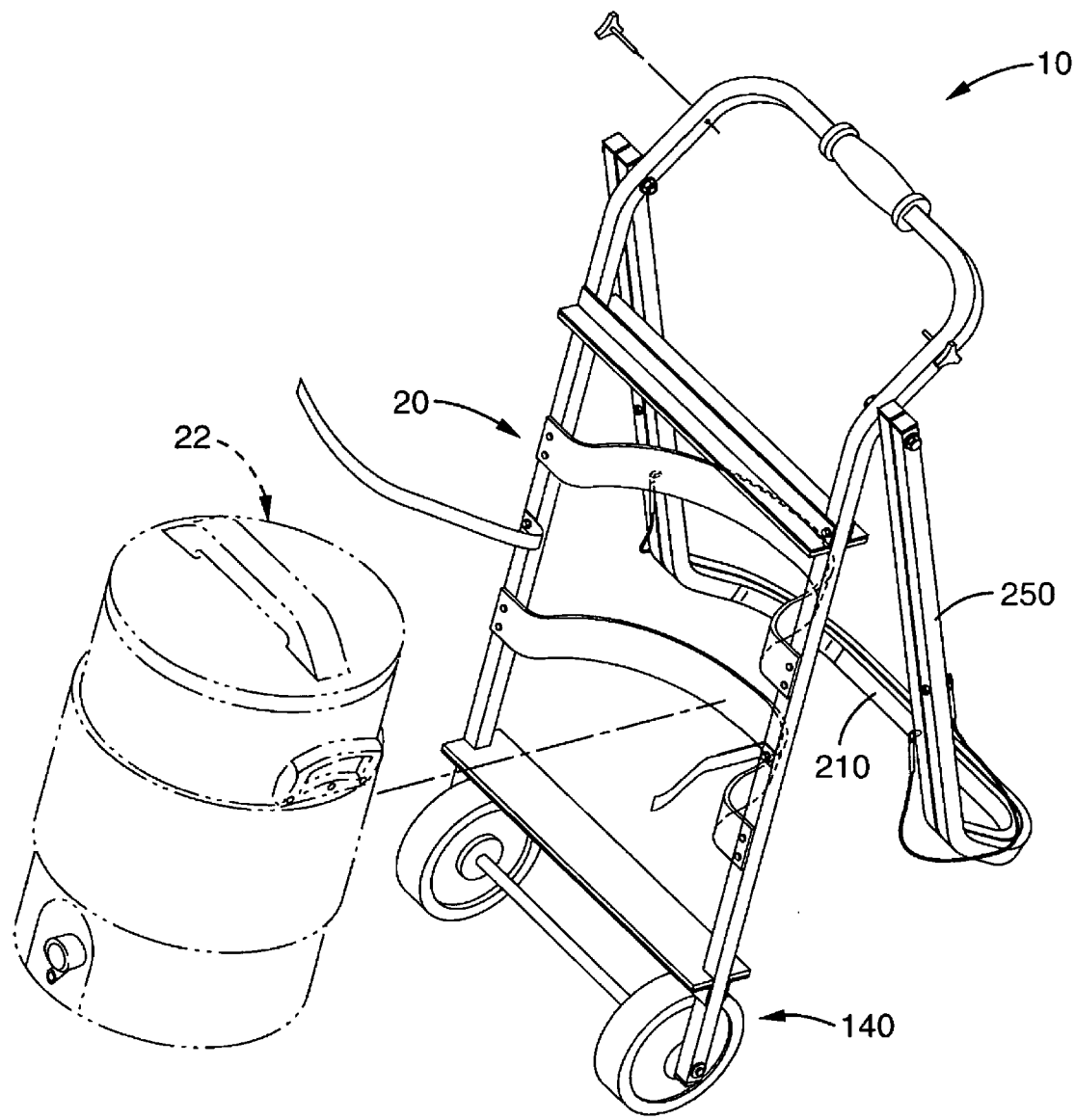
FIG. 4 is a perspective front view of an embodiment of the combination cart and stand device shown in the free standing cart configuration and showing the phantom illustrated liquid dispensing device removed therefrom.

Furthermore, and referring to FIGS. 3 and 4, one embodiment of the combination cart and stand device 10 provides a third or a stationary free standing cart configuration wherein the inner and outer cart support members 210 and 250 are positioned for supporting the cart assembly 20 in a free standing inclined position relative to the underlying surface with or without the liquid dispensing container 22.

Hence, and in one embodiment, the combination cart and stand device 10 is selectively convertible between the rolling cart configuration for transporting the liquid dispensing container 22 along the underlying surface, the stationary free standing cart configuration for supporting the cart assembly 20 in an upright and inclined position relative to the underlying surface with or without the liquid dispensing container 22 thereon, and the stand configuration for supporting the liquid dispensing container 22 in an elevated liquid dispensing position. Thus, the combination cart and stand device 10 can be unfolded from the cart configuration to the stand configuration and subsequently folded back to the cart configuration to the stand configuration. Additionally, other types of containers can also be employed with these three configurations. Furthermore, the combination cart and stand device 10 may be converted into additional configuration that may serve a particular purpose.

Figure 5:
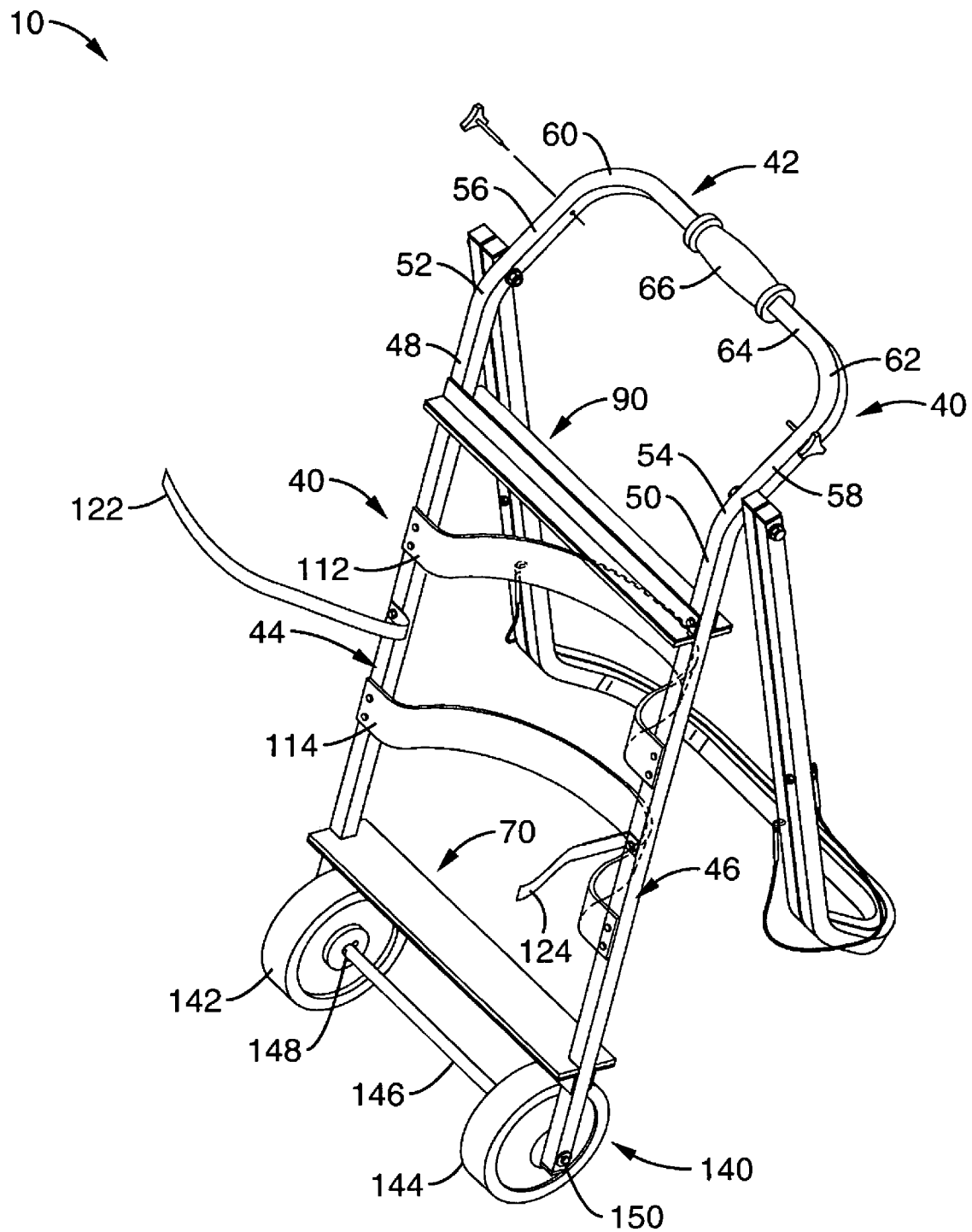
FIG. 5 is a perspective front view of an embodiment of the combination cart and stand device shown in the free standing cart configuration.
Figure 6:
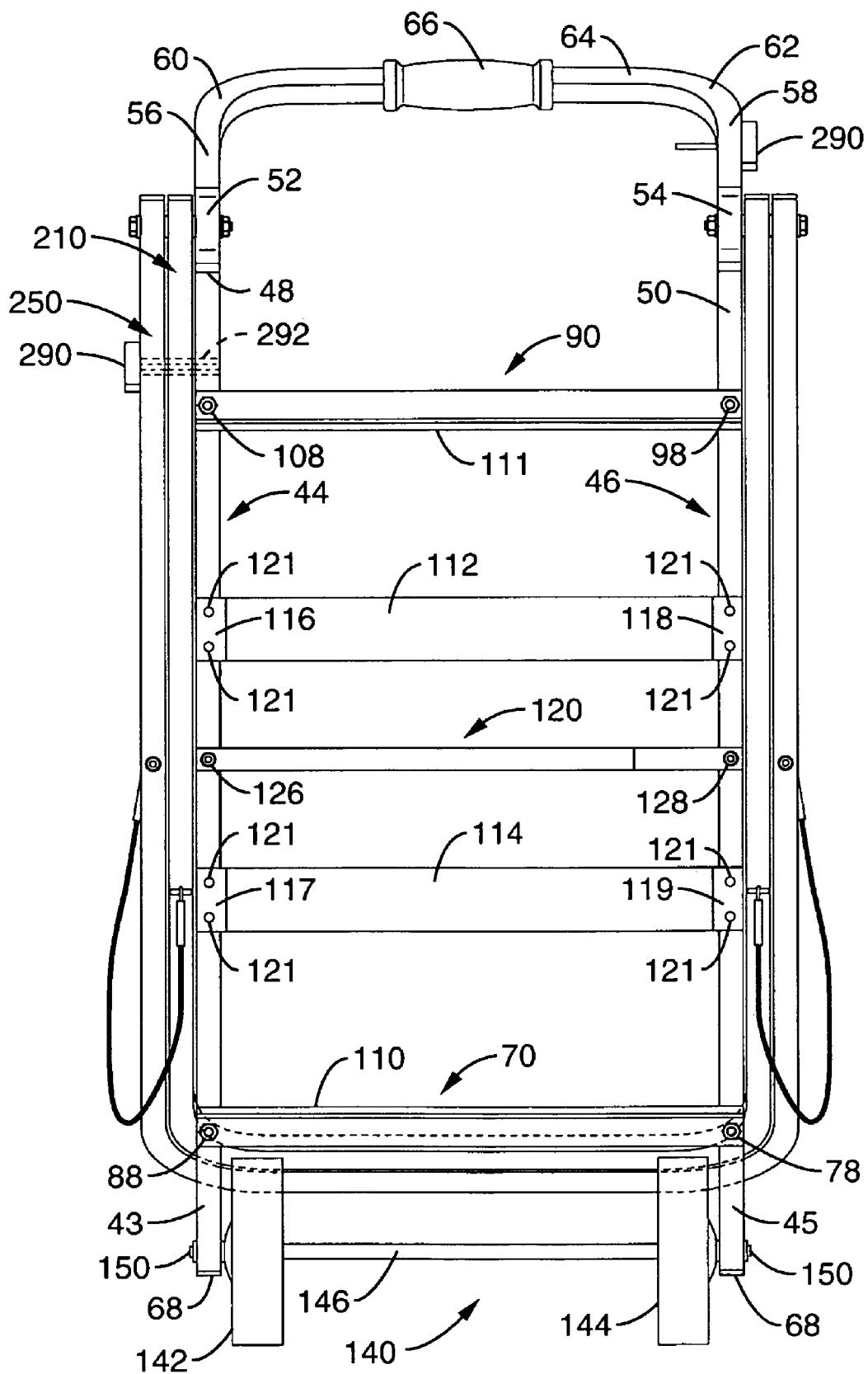
FIG. 6 is a front elevation view of an embodiment of the combination cart and stand device shown in the rolling cart configuration.
Figure 7:
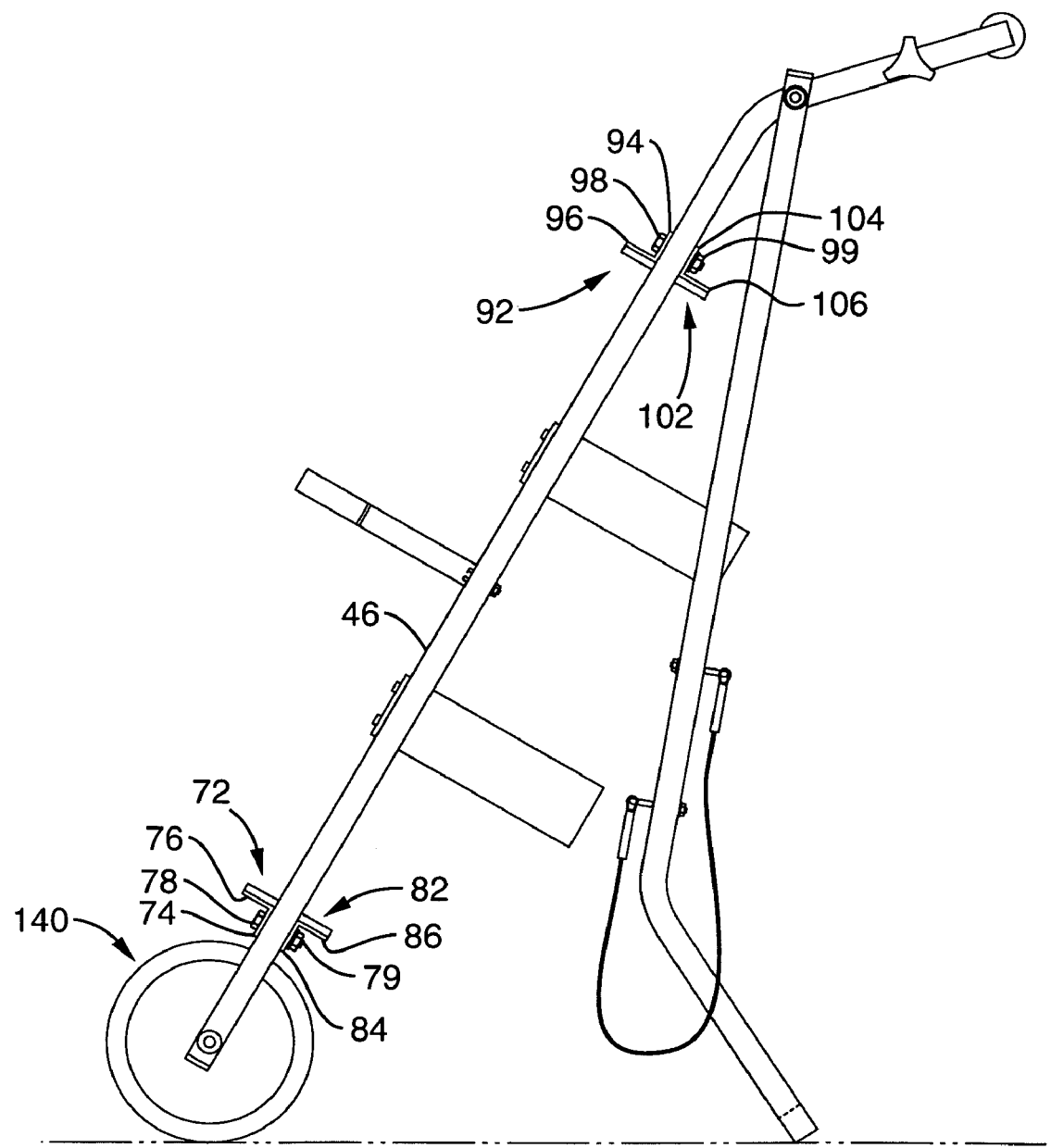
FIG. 7 is a side elevation view of an embodiment of the combination cart and stand device shown in the free standing cart configuration.

More specifically, and referring to FIGS. 5 through 7, one embodiment of the main frame assembly 40 is comprised of a generally U-shaped main frame member 42 which is inverted or downwardly opens when the device 10 is in the cart configuration and which comprises a pair of generally parallel elongated main frame members 44 and 46 which are transversely spaced apart a distance for removably receiving the container 22 (shown in at least FIGS. 1 through 3) and which extend between lower end portions 43 and 45 and upper end portions 48 and 50. Upper end portions 48 and 50 of the elongated main frame members 44 and 46 respectively transition into smoothly and rearwardly curved bends 52 and 54 which, in turn, transition into generally parallel abbreviated main frame members 56 and 58 which are transversely spaced apart a distance generally equal to the distance between the elongated main frame members 44 and 46. The abbreviated main frame members 56 and 58 rearwardly extend from the respective curved bends 52 and 54 and transition into smoothly and inwardly curved bends 60 and 62 which, in turn, transition into respective ends of an upper transverse handle member 64 thereby completing the generally U-shaped main frame member 42.

In one embodiment, a soft grip 66 circumscribes at least a medial portion of the transverse handle member 64 for providing a comfortable and sure gripping position for a user's hand when the device 10, in the folded cart configuration is, being pushed or pulled.

Additionally, and in one embodiment, the rearwardly curved bends 52 and 54 may each be generally about forty five degrees and the inwardly curved bends 60 and 62 may each be generally about ninety degrees. Furthermore, and in one embodiment, lower end portions 43 and 45 of the pair of generally parallel elongated main frame members 44 and 46 are each provided with an end cap 68.

Still referring to FIGS. 5 through 7, the main frame assembly 40 is further comprised of a cart platform assembly 70 and a stand platform assembly 90 which transversely extend between and are connected to the pair of generally parallel elongated main frame members 44 and 46 of the main frame member 42 in a longitudinally spaced apart and facing relationship for supporting the liquid dispensing container 22 in the different configurations of the device 10 as shown in at least FIGS. 1 through 3.

More specifically, the cart platform assembly 70 is comprised of a pair of inverted L-shaped members 72 and 82 (FIG. 7) each having a transverse length substantially equal to the distance between the two outside surfaces of the pair of generally parallel elongated main frame members 44 and 46. Inverted L-shaped member 72 is comprised of a first leg member 74 that abuts against and is coupled to front surfaces of the pair of generally parallel elongated main frame members 44 and 46 and a first base member 76 which forwardly extends from the first leg member 74. Similarly, inverted L-shaped member 82 is comprised of a second leg member 84 that abuts against and is coupled to rear surfaces of the pair of generally parallel elongated main frame members 44 and 46 and a second base member 86 which rearwardly extends from the second leg member 84 wherein the first and second base members 76 and 86 form a cart platform connected to the pair of generally parallel elongated main frame members 44 and 46 of the generally U-shaped main frame member 42 at a location proximate to the wheel assembly 140 while providing wheel clearance.

In one embodiment, a first bolt 78 passes through the first leg member 74, the elongated main frame member 46, and the second leg member 84 where a nut 79 is threadedly received thereby for coupling or fastening first ends of the pair of the inverted L-shaped members 72 and 82 to the elongated main frame member 46. Similarly, a second bolt 88 (FIG. 6) passes through the first leg member 74, the elongated main frame member 46, and the second leg member 84 where a second nut is threadedly received thereby for coupling or fastening the second ends of the pair of the inverted L-shaped members 72 and 82 to the elongated main frame member 46.

Similar to the cart platform assembly 70, the stand platform assembly 90 is comprised of a pair of L-shaped members 92 and 102 (FIG. 7) each having a transverse length substantially equal to the distance between the two outside surfaces of the pair of generally parallel elongated main frame members 44 and 46. L-shaped member 92 is comprised of a third leg member 94 that abuts against and is coupled to front surfaces of the pair of generally parallel elongated main frame members 44 and 46 and a third base member 96 which forwardly extends from the third leg member 94. L-shaped member 102 is comprised of a fourth leg member 104 that abuts against and is coupled to rear surfaces of the pair of generally parallel elongated main frame members 44 and 46 and a fourth base member 106 which rearwardly extends from the fourth leg member 104 wherein the third and fourth base members 96 and 106 form a stand platform connected to the pair of generally parallel elongated main frame members 44 and 46 of the generally U-shaped main frame member 42 at a location longitudinally spaced from and facing the first and second base members 76 and 86 forming the cart platform at a distance for allowing the container 22 to be received therebetween.

In one embodiment, a third bolt 98 passes through the third leg member 94, the elongated main frame member 46, and the fourth leg member 104 where a nut 99 is threadedly received thereby for coupling or fastening first ends of the pair of the L-shaped members 92 and 102 to the elongated main frame member 46. Similarly, a fourth bolt 108 (FIG. 6) passes through the third leg member 94, the elongated main frame member 44, and the fourth leg member 104 where a nut is threadedly received thereby for coupling or fastening the second ends of the pair of the L-shaped members 92 and 102 to the elongated main frame member.

In one embodiment, at least one washer or spacer may provided between the head of the bolts 78, 88, 98, 108 and the leg members, between the leg members and the elongated frame members, and between the leg members and the nuts.

Additionally, and in one embodiment, a piece of pliable material 110 and 111 such as rubber may be coupled to the cart platform and the stand platform as shown in FIG. 6 by, for example, adhesive.

Still referring to FIGS. 5 through 7, the main frame assembly 40 is further comprised of a pair of longitudinally spaced apart flexible straps 112 and 114 coupled to the pair of generally parallel elongated main frame members 44 and 46 which form a rearwardly extending concave shape when receiving a side surface of the container 22 as shown in at least FIG. 1. In one embodiment, the ends of the straps 112 and 114 are respectively sandwiched between metal strips 116, 117, 188, and 119 and the respective front surfaces of the pair of generally parallel elongated main frame members 44 and 46 and are connected thereto by, for example, rivets 121.

Additionally, and in one embodiment, the main frame assembly 40 is further comprised of a two piece hook and loop strap 120 comprised of a first strap member 122 having a hook portion and a second strap member 124 having a loop portion. One end of first strap member 122 is connected to elongated main frame member 44 at a location between the pair of longitudinally spaced apart flexible straps 112 and similarly, one end of the second strap member 124 is connected to elongated main frame member 46 at a location between the pair of longitudinally spaced apart flexible straps 112 and 114 wherein the two piece hook and loop strap 120 can be placed around a side surface of the container 22 and the unconnected end portions of the first and second strap members 122 and 124 can couple together by fastening the hook and loop portions of the first and second strap members 122 and 124 together for securing the container 22 between the two piece hook and loop strap 120 and the pair of longitudinally spaced apart flexible straps 112 and 114 while the container 22 is at rest on either the cart platform assembly 70 (as shown in at least FIGS. 1 and 3) or the stand platform assembly 90 (as shown in at least FIG. 2). In one embodiment, the end of the first strap member 122 is connected to the elongated main frame member 44 by being bolted thereto with bolt 126. Likewise, and in one embodiment, the end of second strap member 124 is connected to the elongated main frame member 46 by being bolted thereto with bolt 128.

Still referring to FIGS. 5 through 7, the cart assembly 20 (FIG. 1) is further comprised of a wheel assembly 140 disposed proximate the lower ends 43 and 45 of the elongated main frame members 44 and 46 for providing sufficient clearance between the lower ends of the elongated main frame members relative to the underlying surface when transporting the device 10 over the underlying surface. In one embodiment, the wheel assembly is comprised of a pair of wheels 142 and 144, a rod or axle shaft 146, and outer and inner fasteners or fastening means 148, 150.

More specifically, and when viewed in the cart configuration, the rod or axle shaft 146 extends through openings disposed in the elongated main frame members 44 and 46 proximate the lower ends 43 and 45 thereof and terminates to outer ends which extend beyond outer side surfaces of the elongated main frame members 44 and 46. The rod or axle shaft 146 is precluded from sliding back through the openings in the elongated main frame members by outer fasteners 150 which, in one embodiment, take the form of cotter pins or push-on cap nuts although other fastening means may be employed.

Wheels 142 and 144 are rotatably supported or mounted on the axle shaft 146 at a location inboard of the elongated main frame members 44 and 46 or, in other words, at a location that is interior of the inner side surfaces of the elongated main frame members 44 and 46. The wheels 142 and 144 and are retained in place by, for example, inner cotter pins 150 or other fastening means.

In one embodiment, spacers or washers can be disposed between the outer fasteners 150 and the wheels 142 and 144, between the wheels 142 and 144 and the outer side surfaces of the elongated main frame members 44 and 46, between the inner side surfaces of the elongated main frame members 44 and 46 and wheels 142 and 144, and between the inner fasteners 148 and wheels 142 and 144. Additionally, and in one embodiment, the wheel can be comprised of a plastic hub circumscribed by a rubber tire; however, other wheel materials and wheel configurations may be employed in the wheel assembly 140.

Figure 8:
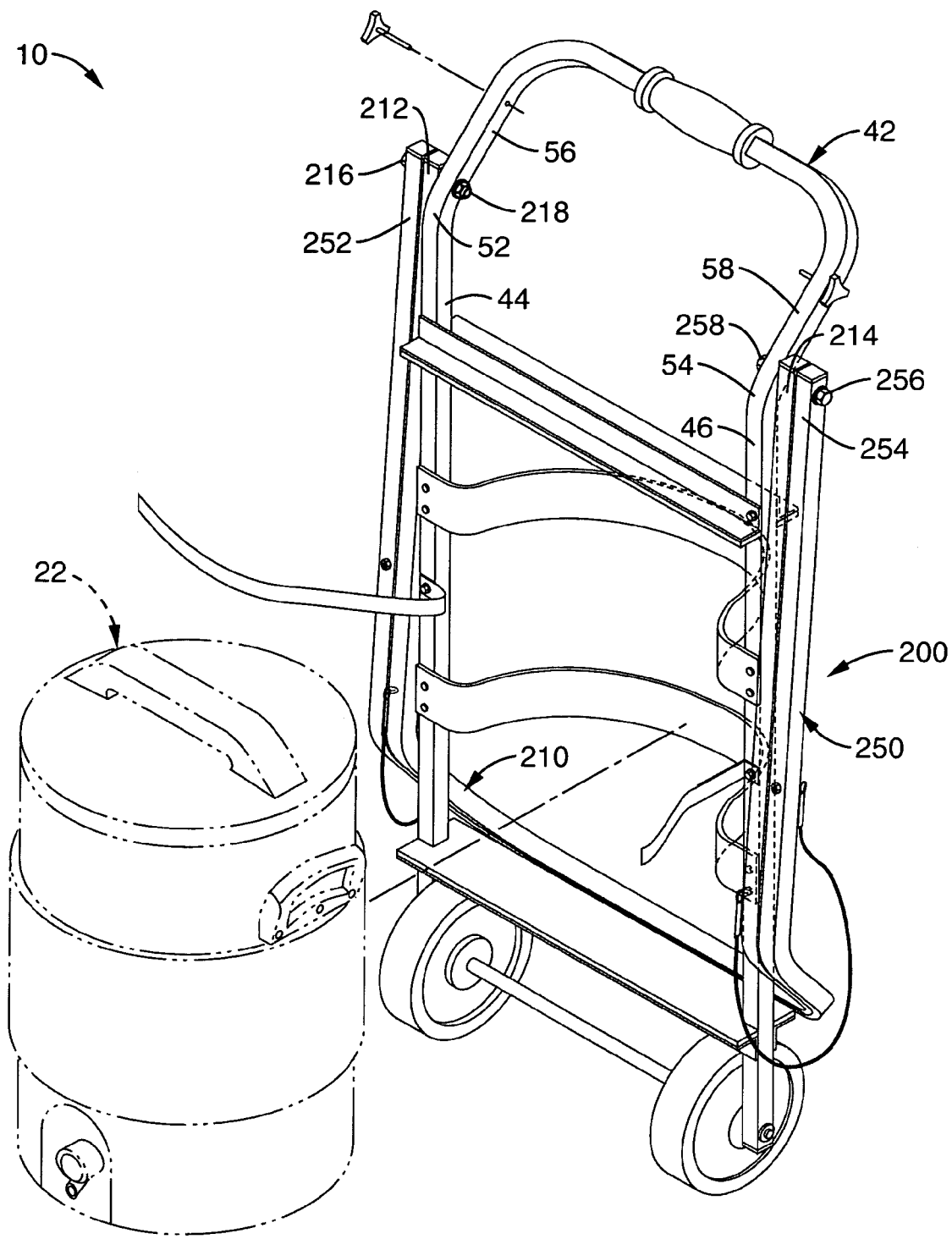
FIG. 8 is a perspective front view of an embodiment of the combination cart and stand device shown in the rolling cart configuration and showing the phantom illustrated liquid dispensing device removed therefrom.
Figure 9:
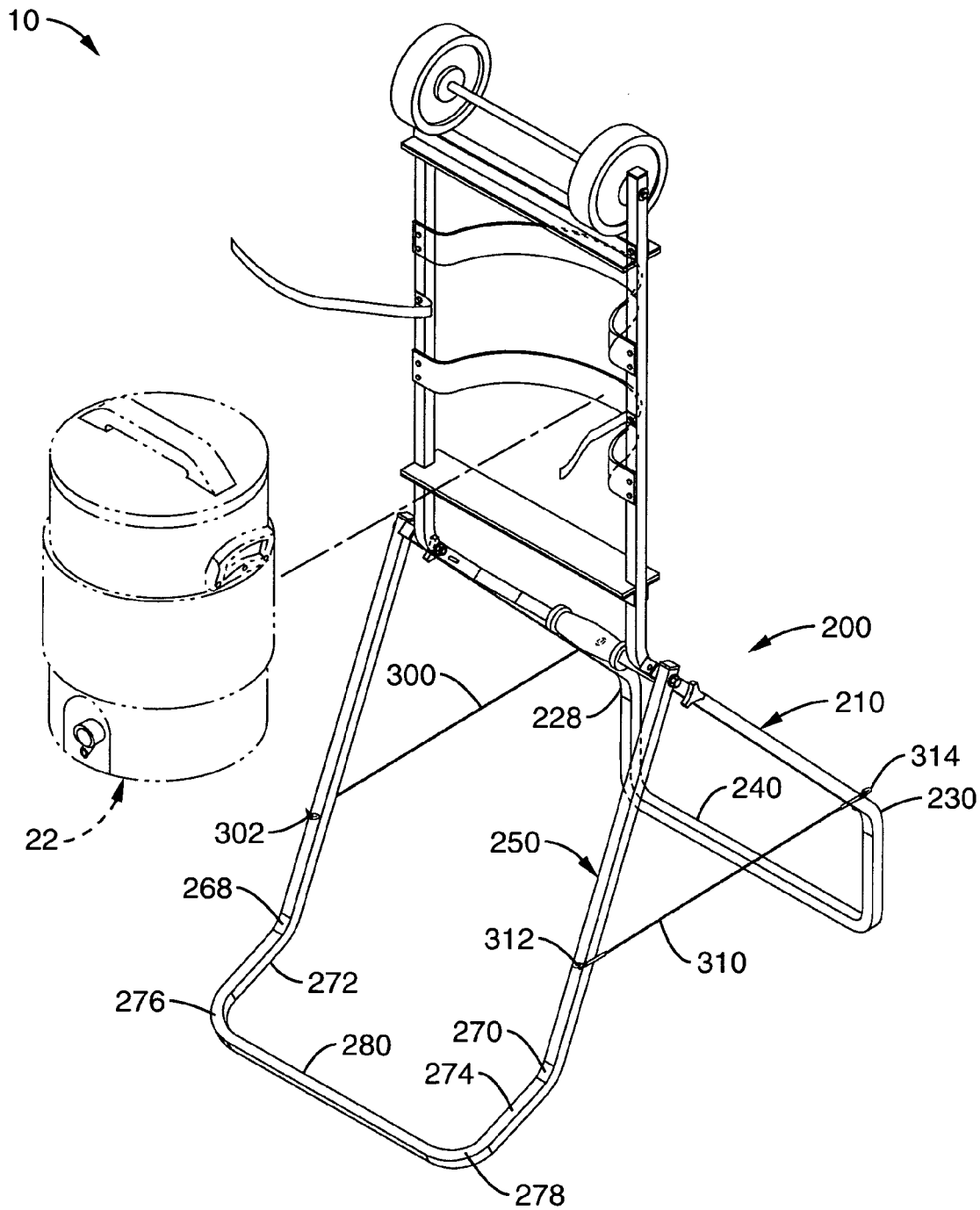
FIG. 9 is a perspective front view of an embodiment of the combination cart and stand device shown in the stationary stand configuration and showing the phantom illustrated liquid dispensing device removed therefrom.
Figure 10:
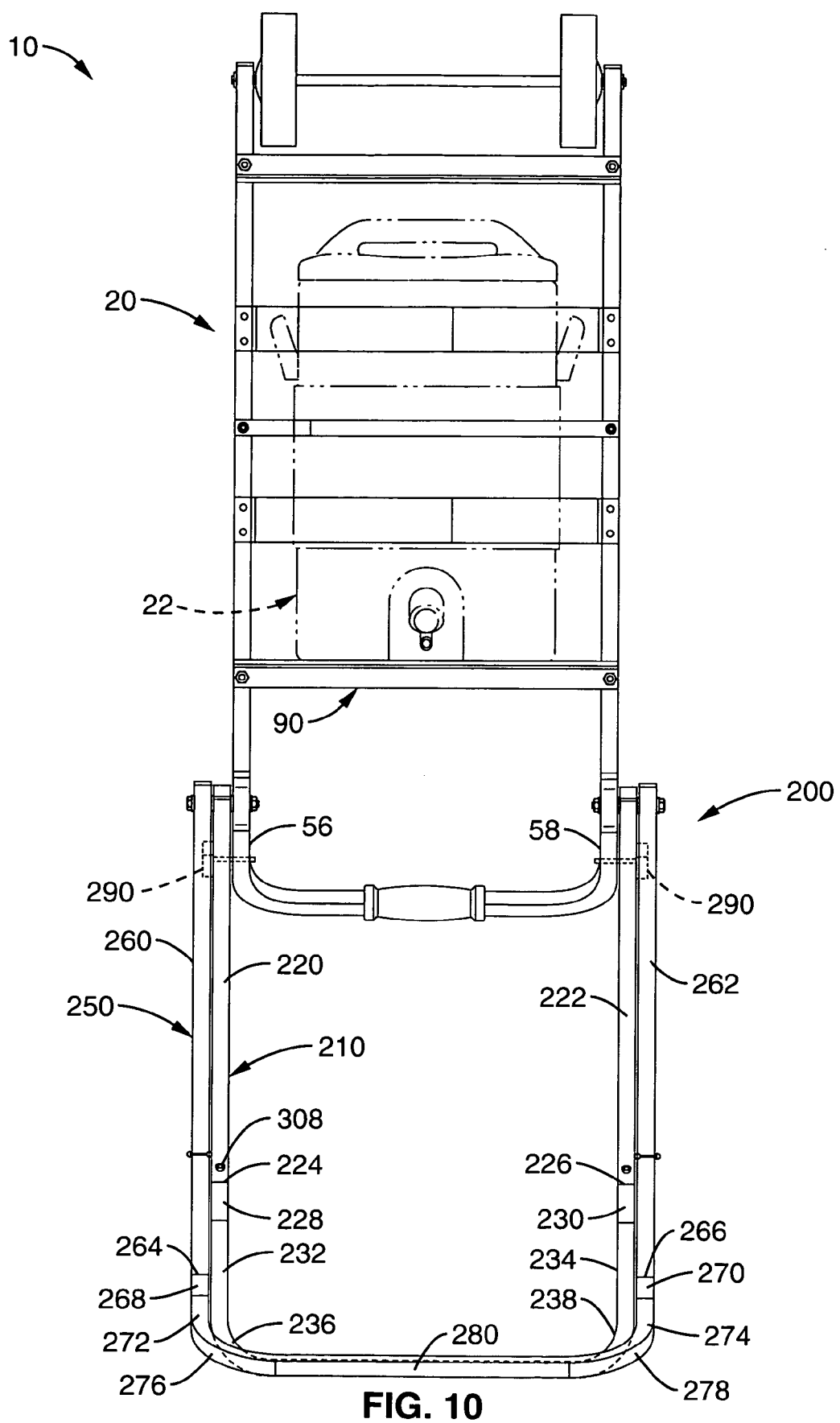
FIG. 10 is a front elevation view of an embodiment of the combination cart and stand device shown in the stationary stand configuration and shown supporting the phantom illustrated liquid dispensing device at an elevated position relative to an underlying surface.

Referring now to FIGS. 8 through 10, the combination cart and stand device 10 is further comprised of the support assembly 200. The support assembly 200 is comprised of a first or inner generally U-shaped support member 210 having upper ends 212, 214 and a second or outer generally U-shaped support member 250 having upper ends 252, 254. The upper ends 212, 214 and 252, 254 are pivotally mounted to the main frame 42 via pivoting means such as pivot bolts 216 and 256 and associated nuts 218 and 258. In one embodiment, the pivot bolts are disposed through apertures proximate the upper ends 212, 214 and 252, 254 of the respective inner and outer generally U-shaped members 210, 250 and through the abbreviated main frame members 56 and 58 at a location adjacent the smoothly and rearwardly curved bends 52 and 54 for positioning the inner and outer generally U-shaped support members 210 and 250 behind the elongated main frame members 44 and 46 when the device 10 is in the cart configuration.

In one embodiment, the inner generally U-shaped support member 210 is sized such that the elongated main frame members 44 and 46 of the main frame member 42 are received between or nest within the inner generally U-shaped support member 210 which, in turn, is sized to nest within the outer generally U-shaped support member 250 when the device 10 is in the folded cart configuration. Additionally, the inner and outer generally U-shaped support members 210 and 250 can be retained in this nested position along with the main frame member 42 by one or more lock ball pull pins 290 extending through coaxially aligned apertures in the outer generally U-shaped support member 250, the inner generally U-shaped support member 210, and either the elongated main frame member 44 or 46 of the main frame member 42. In one embodiment, a single lock ball pull pin 290 is used to retain this nested position by extending through coaxially aligned apertures 292 in the outer generally U-shaped support member 250, the inner generally U-shaped support member 210, and elongated main frame members 44 of the main frame member 42 as shown in FIG. 6.

Still referring to FIGS. 8 through 10, the first or inner generally U-shaped support member 210 is comprised of a pair of generally parallel elongated legs 220, 222 which are transversely spaced apart a distance for removably receiving or nesting with the elongated main frame members 44 and 46 as delineated hereinabove. The upper ends 212, 214 of the inner generally U-shaped support member 210 form the respective upper ends of the elongated legs 220, 222 which are pivotally coupled to the main frame as also delineated hereinabove.

Referring to FIG. 10, and when viewed in the stand configuration, respective lower ends 224 and 226 of the elongated legs 220 and 222 respectively transition into smoothly and downwardly curved bends 228 and 230 which, in turn, transition into generally parallel abbreviated legs 232 and 234 which are transversely spaced apart a distance generally equal to the distance between the elongated legs 220 and 222. Additionally, and again when viewed in the stand configuration, the abbreviated legs 232 and 234 transition into smoothly and inwardly curved bends 236 and 238 which, in turn, transition into respective ends of a lower transverse or cross member 240 (FIG. 9) thereby generally defining a bottom portion of the first or inner generally U-shaped support member 210.

Furthermore, and in one embodiment, the smoothly and downwardly curved bends 228 and 230 may each be generally about forty-five degrees and the smoothly and inwardly curved bends 236 and 238 may each be generally about ninety degrees.

Referring to FIGS. 8 through 10, the second or outer generally U-shaped support member 250 is comprised of a pair of generally parallel elongated legs 260, 262 which are transversely spaced apart a distance for removably receiving or nesting around the inner generally U-shaped support member 210 as delineated hereinabove. The upper ends 252 and 254 of the outer generally U-shaped support member 250 form the respective upper ends of the elongated legs 260 and 262 which are pivotally coupled to the main frame as also delineated hereinabove.

Referring to FIG. 10, and when viewed in the stand configuration, lower ends 264 and 266 of the elongated legs 260 and 262 respectively transition into smoothly and forwardly curved bends 268 and 270 which, in turn, transition into generally parallel abbreviated legs 272 and 274 which are transversely spaced apart a distance generally equal to the distance between the elongated legs 260 and 262. Additionally, and again when viewed in the stand configuration, the abbreviated legs 272 and 274 forwardly extend from the respective forwardly curved bends 268 and 270 and transition into smoothly and inwardly curved bends 276 and 278 which, in turn, transition into respective ends of a lower transverse or cross member 280 thereby generally defining a bottom portion of the second or outer generally U-shaped support member.

Furthermore, and when viewed in the stand configuration, the smoothly and forwardly curved bends 268 and 270 may each be generally about forty five degrees and the smoothly and inwardly curved bends 276 and 278 may each be generally about ninety degrees.

Moreover, and in one embodiment, each of the pivot bolts 216 and 256 include a bolt head at one end transitioning into an elongated smooth shaft terminating to a threaded end for receiving receptive nuts 218 and 258. Additionally, spacers or washers can be received on the pivot bolts 216 and 256 and interposed between each of the bolt heads and the upper ends of the outer generally U-shaped support member, between each of the upper ends of the outer generally U-shaped support member and the upper ends of the inner generally U-shaped support member, between the upper ends of the inner generally U-shaped support member and the abbreviated main frame members, and between the abbreviated main frame members and the nuts 218 and 258.

Referring to FIGS. 9 and 10, the support assembly 200 is further comprised of a plurality of tethers connected between the inner and outer support members for defining the maximum distance of separation that is allowed therebetween for providing a stable stand configuration. More specifically, and in one embodiment, first and second tethers 300 and 310 are provided and formed by a rubber coated steel cable. The first tether 300 includes a first end connected to the outer support member via an eyebolt 302 and a second end connected to the inner support member via an eyebolt 308 on one side of the support assembly 200. Similarly, the second tether 310 includes a first end connected to the outer support member via an eyebolt 312 and a second end connected to the inner support member via an eyebolt 314 on the other side of the support assembly 200. Thus, as shown in at least FIG. 9 the first and second tethers 300 and 310 define the maximum length of separation between the inner and outer support members for providing a stable stand configuration.

Additionally, and referring to FIG. 10, the support assembly 200 is further comprised of at least two lock ball pull pins 290 which traverse apertures in each of the elongated legs 220, 222 of the inner generally U-shaped support member 210 and the abbreviated main frame members 56 and 58 for holding the cart assembly 20 in an inverted position while the container 22 rests upright on the stand platform assembly 90.

In use and operation, and referring to FIGS. 1 through 10, the combination cart and stand device 10 can be employed for transporting, storing, and using a liquid dispensing container such as a water container or other container. When the device 10 is in the folded cart configuration or the stationary free standing cart configuration, the two piece hook and loop strap 120 is decoupled and the liquid dispensing container or other container is manually placed onto the pliable material 110 of the cart platform assembly 70 against the flexible straps 112 and 114 and between the main frame members 44 and 46. Then, the two piece hook and loop strap 120 is refastened or coupled together such that the device 10 with the container 22 supported thereon can be hand carted or transported to a desired location (pushed or pulled) via the soft grip 66 circumscribing the transverse handle member 64. A bungee cord or other fastening means may be employed for the hook and loop strap 120. Once located, the hook and loop strap 120 can be decoupled and the liquid dispensing container 22 or other container can be manually removed from the cart platform assembly 70 by the user or operator. Then, the user or operator can remove the lock ball pull pin or pins 290 from the device 10 to decouple the nesting of the outer generally U-shaped support member 250, the inner generally U-shaped support member 210, the main frame member 42 and pivot the support members 210 and 250 back away from the main frame member 42 about pivot bolts or pins 216 and 256 and along double ended arrow 400 (FIG. 3) towards a spaced apart relationship as shown in FIG. 9 and then pivot the main frame forwardly away from the support members 210 and 250 about pivot bolts or pins 216 and 256 along double ended arrow 402 (FIG. 3) from a generally inverted U-shaped orientation to a generally upright U-shaped orientation as shown in FIGS. 2, 9, and 10. Next, the lock ball pull pin or pins 290 are used to secure the main frame member 42 to the inner support member 210 as shown in at least FIG. 9 for orientating the main frame generally perpendicular relative to the underlying surface of the support members 210 and 250. Finally, the liquid dispensing container 22 or other container can be manually lifted up and onto the pliable material 111 of the stand platform assembly 90 and secured thereon by refastening the two piece hook and loop strap 120 thereby transforming or converting the device 10 from the rolling folded cart configuration to the stationary unfolded stand configuration for dispensing liquid such as water, GATORADE, or other liquid to one or more people (or perhaps animals) to refresh, rehydrate, and/or replenish them with liquids. The above process of unfolding the device 10 from the folded cart configuration to the unfolded stand configuration can be sequentially reversed for transforming or converting the device 10 from the stationary unfolded stand configuration to the folded cart configuration.

Additionally, and in one embodiment, the main frame member 42, the inner generally U-shaped support member 210, and the outer generally U-shaped support member 250 may be formed from three quarter inch square 6063 aluminum tubing and bent to shape. Additionally, and in one embodiment, the flexible straps 112 and 114 may be formed from nylon, the wheel 142 and 144 may be six inches in diameter and made from plastic and rubber, the lock ball pull pins 290 may be formed from steel, the tethers 300 and 310 may be formed from one-eighth inch rubber coated cable, and all of the nuts, bolts, and washers may be formed from steel. Furthermore, and in one embodiment, the combination cart and stand device 10 in the rolling folded cart configuration, may be approximately forty two inches in height, twenty inches in width, and seven inches in depth and in the unfolded stand configuration, the device 10 may be approximately sixty inches in height and thirty inches in width at the bottom. Employing the above listed materials and dimensions results in one embodiment of the combination cart and stand device 10 having a total weight of approximately six pounds.

Accordingly, it should be apparent that further numerous structural modifications and adaptations may be resorted to without departing from the scope and fair meaning of the present invention as set forth hereinabove and as described herein below by the claims.

I claim:

1. A combined cart and stand device comprising:
   a generally inverted U-shaped main frame comprised of a transverse member having outer ends transitioning into a pair of generally parallel elongated main frame members transversely spaced apart a distance for removably receiving a liquid dispensing container therebetween;
   a first platform and a second platform transversely extending between and operatively coupled to said pair of generally parallel elongated main frame members in a longitudinally spaced apart and facing relationship;
   means for rolling said generally inverted U-shaped main frame along an underlying surface of said device with the liquid dispensing container supported on said first platform; and
   means for supporting said generally inverted U-shaped main frame in a pivoted upright and elevated orientation with the liquid dispensing container supported on said second platform for positioning the liquid dispensing container in an elevated liquid dispensing orientation, wherein said supporting means is comprised of a pair of generally U-shaped support members pivotally coupled to said generally inverted U-shaped main frame for pivoting said pair of generally U-shaped support members from a nested position relative to said inverted U-shaped main frame to a spaced apart position and for pivoting said generally inverted U-shaped main frame a first position supporting the liquid dispensing container on said first platform to said pivoted upright and elevated orientation for supporting the liquid dispensing container on said second platform in said elevated liquid dispensing orientation.

2. The device of claim 1 wherein said rolling means is comprised a wheel assembly supporting wheels and operatively coupled to said generally inverted U-shaped main frame for rolling said generally inverted U-shaped main frame along an underlying surface of said device with the liquid dispensing container supported on said first platform.

3. A combined cart and stand device convertible between a cart and a stand configuration, said device comprising:
   a main frame comprised of a pair of, generally parallel elongated main frame members transversely spaced apart a distance for removably receiving a liquid dispensing container therebetween;
   a first platform and a second platform transversely extending between and operatively coupled to said pair of generally parallel elongated main frame members in a longitudinally spaced apart and facing relationship;
   a wheel assembly supporting wheels and operatively coupled to said pair of generally parallel elongated main frame members for engaging an underlying surface of said device when said device is in said cart configuration for providing rolling movement of said device with the liquid dispensing container supported on said first platform;
   a pair of generally U-shaped support members having upper end portions; and
   means for pivotally coupling said upper end portions of said pair of generally U-shaped support members to said main frame at a location distal from said wheel assembly for pivoting said pair of generally U-shaped support members from a nested position relative to said main frame when said device is in said cart configuration to a spaced apart position and for pivotally inverting said main frame from a first position supporting the liquid dispensing container on said first platform to an elevated and inverted position when said device is in said stand configuration for supporting the liquid dispensing container on said second platform in an elevated liquid dispensing orientation.

4. The device of claim 3 wherein said main frame is generally U-shaped and includes a transverse member having outer ends transitioning into said pair of generally parallel elongated main frame members and wherein said generally U-shaped main frame opens downwardly when said device is in said cart configuration and opens upwardly when said dive is in said stand configuration.

5. The device of claim 4 further including a pliable grip circumscribing said transverse member.

6. The device of claim 5 wherein said main frame and said pair of generally U-shaped support members are formed from aluminum.

7. A combined cart and stand device convertible between a cart configuration for transporting a liquid dispensing container and a stand configuration for supporting the liquid dispensing container in an elevated liquid dispensing orientation, said device comprising:
   a generally U-shaped main frame member having an inverted orientation in said cart configuration and comprised of a transverse handle member having outer ends transitioning to a pair of generally parallel elongated main frame members transversely spaced apart a distance for removably receiving the liquid dispensing container;
   a substantially horizontal cart platform and a substantially horizontal stand platform transversely extending between and operatively coupled to said pair of generally parallel elongated main frame members in a longitudinally spaced apart and facing relationship for supporting the liquid dispensing container on said cart platform between said pair of generally parallel elongated main frame members when said device is in said cart configuration and for supporting the liquid dispensing container on said stand platform between said pair of generally parallel elongated main frame members when said device is in said stand configuration;
   an axle connected to said pair of generally parallel elongated main frame members at a location distal from said transverse handle member;

a pair of transversely spaced apart wheels mounted on said axle at a location inboard of said pair of generally parallel elongated main frame members for engaging an underlying surface of said device with said wheels when said device is in said cart configuration for allowing rolling movement of said device for transporting the liquid dispensing container supported on said cart platform;

a pair of generally U-shaped support members;

means for pivotally coupling said pair of generally U-shaped support members to said generally U-shaped main frame member at a location proximate said transverse handle member for pivoting said pair of generally U-shaped support members apart from a nested position in said cart configuration to a spaced apart position in said stand configuration and for pivotally inverting said generally U-shaped main frame member from said inverted orientation to an upright orientation; and means for locking said generally U-shaped main frame member in said upright orientation such that said generally U-shaped main frame member is supported by said spaced apart position of said generally U-shaped support members in said stand configuration for supporting the liquid dispensing container on said stand platform in an elevated liquid dispensing orientation.

8. The device of claim 7 wherein said generally U-shaped main frame member and said pair of generally U-shaped support members are formed from aluminum.

9. The device of claim 8 further including a pliable grip circumscribing said transverse handle member.

* * * * *